United States Patent
Ikoshi et al.

(10) Patent No.: US 8,361,211 B2
(45) Date of Patent: *Jan. 29, 2013

(54) INKJET RECORDING LIQUID

(75) Inventors: Masao Ikoshi, Ashigarakami-gun (JP); Koji Furukawa, Ashigarakami-gun (JP); Yoshimitsu Arai, Ashigarakami-gun (JP); Katsuyuki Hirato, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 12/404,034

(22) Filed: Mar. 13, 2009

(65) Prior Publication Data
US 2009/0235842 A1 Sep. 24, 2009

(30) Foreign Application Priority Data
Mar. 19, 2008 (JP) ................. 2008-071056

(51) Int. Cl.
*C09D 11/02* (2006.01)
(52) U.S. Cl. ................. 106/31.58; 106/31.86
(58) Field of Classification Search ........... 106/31.58, 106/31.86
See application file for complete search history.

(56) References Cited

U.S. PATENT DOCUMENTS

| | | | |
|---|---|---|---|
| 5,772,746 A * | 6/1998 | Sawada et al. ......... 106/31.86 |
| 6,261,350 B1 | 7/2001 | Kabalhov | |
| 6,379,443 B1 * | 4/2002 | Komatsu et al. ........ 106/31.58 |
| 6,500,248 B1 * | 12/2002 | Hayashi ................ 106/31.86 |
| 6,554,891 B1 * | 4/2003 | Momose et al. ......... 106/31.86 |
| 6,641,652 B2 * | 11/2003 | Ouchi et al. ........... 106/31.6 |
| 7,264,664 B2 | 9/2007 | Kamoto et al. | |
| 7,300,508 B2 | 11/2007 | Hiroki et al. | |
| 2001/0023266 A1 | 9/2001 | Miyabayashi | |
| 2002/0198287 A1 | 12/2002 | Ohta et al. | |
| 2007/0234931 A1 * | 10/2007 | Rehman ............... 106/31.6 |
| 2009/0202723 A1 * | 8/2009 | Ikoshi et al. .......... 427/256 |
| 2009/0231366 A1 * | 9/2009 | Arai et al. ............. 347/5 |

FOREIGN PATENT DOCUMENTS

| | | |
|---|---|---|
| JP | 9-176538 A | 7/1997 |
| JP | 2001-187854 A | 1/2000 |
| JP | 2004-209762 A | 7/2004 |
| JP | 3932820 B2 | 3/2007 |
| JP | 2007-152873 A | 6/2007 |

OTHER PUBLICATIONS

English translation of JP 2007-152873.*
English Machine Translation of JP 2001-187854.*
Office Action dated Sep. 14, 2010 on Japanese Patent Application No. 2009-059318.

* cited by examiner

*Primary Examiner* — Melvin C Mayes
*Assistant Examiner* — Veronica F Faison
(74) *Attorney, Agent, or Firm* — Sughrue Mion, PLLC

(57) ABSTRACT

An inkjet recording liquid includes: water; at least one colorant; and a water-soluble organic solvent having an SP (solubility parameter) value of 27.5 or less at a content of 70 mass % or more with respect to the total amount of water-soluble organic solvent, wherein the water-soluble organic solvent having an SP value of 27.5 or less includes at least one water-soluble organic solvent having a molecular weight of from 240 to 1400 and represented by the following Formula (1) at a content of 70 mass % or more with respect to the amount of the water-soluble organic solvent having an SP value of 27.5 or less.

$$R\text{-}A_n\text{-}OH \qquad \text{Formula (1)}$$

In Formula (1), R represents a hydrogen atom, an alkyl group having 1 to 4 carbon atoms, or a group derived from a sugar alcohol having 3 to 12 carbon atoms; each A independently represents an ethyleneoxy group or a propyleneoxy group; and n represents an integer of from 3 to 24.

7 Claims, No Drawings

INKJET RECORDING LIQUID

CROSS-REFERENCE TO RELATED APPLICATIONS

This application claims priority under 35 USC 119 from Japanese Patent Application No. 2008-071056 filed on Mar. 19, 2008, the disclosure of which is incorporated by reference herein.

BACKGROUND OF THE INVENTION

1. Field of Invention

The invention relates to an inkjet recording liquid.

2. Description of the Related Art

An inkjet recording method is a method for recording by jetting ink droplets from each of many nozzles formed at an inkjet head, and this method has been widely utilized because of the low level of noise generated during a recording operation, because running costs are inexpensive and because a high-quality image may be recorded on various recording media.

Although various kinds of recording media for inkjet recording are available, such as plain paper, coated paper, glossy paper, OHP sheets, or back print film, low-price plain paper is usually used for business applications in a normal office environment. Examples of required properties in such an environment include reduction or suppression of a curling (warping or rounding of paper) phenomenon caused when a large amount of ink is supplied onto the paper, as well as satisfaction of ordinary requirements. It is important to reduce or suppress both curl during recording and curl caused by drying or evaporating of moisture after recording.

As methods for reducing or suppressing the occurrence of curling, several methods have been proposed. For example, a printing method in which droplet size per drop and printing amount per unit area are controlled by using an ink containing a polyhydric alcohol having a specific molecular weight and a water-soluble amide compound is known (see, for example, Japanese Patent Application Laid-Open (JP-A) No. 2004-209762).

Further, a method for suppressing curl by using a water-based ink containing a solvent having low polarity in an amount of 30% or more with respect to the total weight of the ink is known (see, for example, JP-A No. 2007-152873).

An ink containing two or more polyoxyalkyleneglycol-n-alkyl ethers has been proposed (in, for example, Japanese Patent No. 3,932,820), with which color bleed can be reduced.

SUMMARY OF THE INVENTION

However, in the method disclosed in JP-A No. 2004-209762, there have been problems with respect to practical use since the printing method is greatly restricted. Furthermore, in the ink disclosed in JP-A No. 2007-152873, ink jetting property tends to deteriorate. In addition, the ink disclosed in Japanese Patent No. 3,932,820 cannot suppress the occurrence of curling.

The present invention has been made in consideration of the above problems. Aspects of the invention include the following.

<1> An inkjet recording liquid including water, at least one colorant, and a water-soluble organic solvent having an SP (solubility parameter) value of 27.5 or less at a content of 70 mass % or more with respect to the total amount of water-soluble organic solvent, wherein the water-soluble organic solvent having an SP value of 27.5 or less includes at least one water-soluble organic solvent having a molecular weight of from 240 to 1400 and represented by the following Formula (1) at a content of 70 mass % or more with respect to the amount of the water-soluble organic solvent having an SP value of 27.5 or less.

  Formula (1)

$$R\text{-}A_n\text{-}OH \quad \text{Formula (1)}$$

In Formula (1), R represents a hydrogen atom, an alkyl group having 1 to 4 carbon atoms, or a group derived from a sugar alcohol having 3 to 12 carbon atoms; each A independently represents an ethyleneoxy group or a propyleneoxy group; and n represents an integer of from 3 to 24.

<2> The inkjet recording liquid according to <1> further including a water-soluble organic compound represented by the following Formula (2):

  Formula (2)

$$R^1\text{-}A_m\text{-}OH \quad \text{Formula (2)}$$

In Formula (2), $R^1$ represents a hydrogen atom, an alkyl group having 1 to 4 carbon atoms, or a group derived from a sugar alcohol having 3 to 12 carbon atoms; each A independently represents an ethyleneoxy group or a propyleneoxy group; and m represents an integer of from 35 to 355.

<3> The inkjet recording liquid according to <1> or <2>, wherein the content of the water-soluble organic solvent represented by Formula (1) is 5 mass % or more but less than 30 mass %.

<4> The inkjet recording liquid according to any one of <1> to <3>, wherein the viscosity of the inkjet recording liquid at 25° C. is from 5 mPa·s to 20 mPa·s.

<5> The inkjet recording liquid according to any one of <1> to <4>, wherein the viscosity of the inkjet recording liquid at 40° C. is from 3 mPa·s to 15 mPa·s.

<6> The inkjet recording liquid according to any one of <1> to <5>, further including resin particles.

<7> The inkjet recording liquid according to any one of <1> to <6>, wherein the colorant is a water-dispersible pigment.

<8> The inkjet recording liquid according to any one of <1> to <7>, wherein the colorant is a water-dispersible pigment dispersed by a phase inversion method.

DETAILED DESCRIPTION OF THE INVENTION

Inkjet Recording Liquid

The inkjet recording liquid of the invention (hereinafter, sometimes referred to as simply an "ink") includes water; at least one colorant, and a water-soluble organic solvent having an SP value of 27.5 or less at a content of 70 mass % or more with respect to the total amount of water-soluble organic solvent, wherein the water-soluble organic solvent having an SP value of 27.5 or less includes at least one water-soluble organic solvent having a molecular weight of from 240 to 1400 and represented by the following Formula (1) at a content of 70 mass % or more with respect to the amount of the water-soluble organic solvent having an SP value of 27.5 or less.

The inkjet recording liquid of the invention with the above composition can suppress the occurrence of curling even when an image is recorded on plain paper or general-purpose coated paper other than specialized inkjet paper with an inkjet system. In addition, the inkjet recording liquid of the invention is excellent in storage stability and jetting stability.

  Formula (1)

$$R\text{-}A_n\text{-}OH \quad \text{Formula (1)}$$

In Formula (1), R represents a hydrogen atom, an alkyl group having 1 to 4 carbon atoms, or a group derived from a sugar alcohol having 3 to 12 carbon atoms; each A independently represents an ethyleneoxy group or a propyleneoxy group; and n represents an integer of from 3 to 24.

In addition to the above essential components, the inkjet recording liquid of the invention may contain a surfactant, a resin particle or another component, if needed.

The inkjet recording liquid of the invention can be used for a full color image formation. The inkjet recording liquid may be used as at least one of, or each of, the inks for forming a full color image. In order to form a full color image, a magenta color ink, a cyan color ink, and a yellow color ink can be used. In order to adjust a color tone, a black color ink may be used additionally. Other than yellow, magenta, and cyan color inks, at least one of a red ink, a green ink, a blue ink, a white ink, or an ink having a special color used in the field of printing may be used.

Water-Soluble Organic Solvent

The inkjet recording liquid of the invention includes at least one water-soluble organic solvent having an SP value of 27.5 or less, and the content of the water-soluble organic solvent having an SP value of 27.5 or less is 70 mass % or more with respect to the total amount of water-soluble organic solvent.

Here, the "water-soluble organic solvent" in the invention means an organic solvent which can dissolve by 5 g or more in 100 g of water.

"SP value" as described in the invention means the solubility parameter (SP value) of a solvent, which is a value expressed by the square root of the cohesive energy of molecules. SP values are described in the *Polymer Handbook* (*Second Edition*), Chapter IV: "Solubility Parameter Values", and the values described therein are regarded as SP values in the invention. The unit for the SP value is $(MPa)^{1/2}$, and the SP values given represent values at a temperature of 25° C.

When the SP value data of a solvent of interest is not described in the above reference book, the value calculated by the method described in R. F. Fedors, *Polymer Engineering Science*, 14, p 147-154 (1974) (which is incorporated herein by reference in its entirety) is used as the SP value in the invention.

In the invention, the content of the water-soluble organic solvent having an SP value of 27.5 or less is 70 mass % or more with respect to the total amount of water-soluble organic solvent. From the viewpoint of suppressing curling, the content of the water-soluble organic solvent having an SP value of 27.5 or less is preferably 80 mass % or more, and more preferably 90 mass % or more, with respect to the total amount of water-soluble organic solvent. When the content is less than 70 mass %, the curl suppression effect is decreased.

The inkjet recording liquid according to the invention includes, as a water-soluble organic solvent having an SP value of 27.5 or less, at least one water-soluble organic solvent represented by the above Formula (1) and having a molecular weight of from 240 to 1400 (hereinafter sometimes referred to as "first water-soluble organic solvent").

In Formula (1), R represents a hydrogen atom, an alkyl group having 1 to 4 carbon atoms (such as a methyl group, an ethyl group, a propyl group or a butyl group) or a group derived from a sugar alcohol having 3 to 12 carbon atoms. An alkyl group having 1 to 4 carbon atoms and a group derived from a sugar alcohol having 3 to 6 carbon atoms are preferable from the viewpoint of the curl suppression effect.

Here, the "group derived from a sugar alcohol" means a group formed by removing at least one hydroxyl group from a sugar alcohol. The position of the hydroxyl group to be removed from the sugar alcohol is not particularly limited, and the group derived from the sugar alcohol may be a mixture of two or more kinds of groups formed by removing a hydroxyl group from a position that differs depending on the kind of group. Further, the group derived from a sugar alcohol may be a divalent or higher-valent group formed by removing two or more hydroxyl groups.

In Formula (1), each A independently represents an ethyleneoxy group or a propyleneoxy group. In Formula (1), $A_n$ may include only ethyleneoxy groups or only propyleneoxy groups, or include at least one ethyleneoxy group and at least one propyleneoxy group. When $A_n$ contains at least one ethyleneoxy group and at least one propyleneoxy group, the structure represented by Formula (1) may be a block polymer or a random polymer.

In Formula (1), n represents an integer from 3 to 24. From the viewpoint of the curl suppression effect and ink jetting stability, n is preferably from 3 to 17, and more preferably from 3 to 10.

The SP value of the first water-soluble organic solvent in the invention is 27.5 or less, preferably from 16 to 27.5, and more preferably from 18 to 26.5. When the SP value of the first water-soluble organic solvent is more than 27.5, the curl suppression effect is decreased.

In the invention, the first water-soluble organic solvent may include two or more compounds. In this case, the total content of compounds having an SP value of 27.5 or less is 70 mass % or more, and preferably 90 mass % or more, with respect to the total amount of water-soluble organic solvent.

In the invention, the molecular weight of the first water-soluble organic solvent is from 240 to 1400. When the molecular weight of the first water-soluble organic solvent is less than 240, the sufficient curl suppression effect is not obtained or jetting reliability is decreased. When the molecular weight of the first water-soluble organic solvent is more than 1400, ink jetting property is decreased. In the invention, the molecular weight of the first water-soluble organic solvent is preferably from 240 to 950, and more preferably from 240 to 650, in consideration of the curl suppression effect and jetting property.

In the invention, since the molecular weight of the first water-soluble organic solvent is within the range described above, the degree of freedom in setting the ink viscosity increases, and ink viscosity can be easily set according to the conditions under which the ink is used.

The molecular weight of a water-soluble organic solvent in the invention refers to a molecular weight calculated from the structural formula of the water-soluble organic solvent when the water-soluble organic solvent includes only one compound, and refers to a number average molecular weight when the water-soluble organic solvent is a mixture of plural compounds.

Specific examples of the first water-soluble organic solvent in the invention include, but are not limited to, those described below.

Trioxypropylene glyceryl ether (having an SP value of 26.4, for example NEWPOL GP-250 (trade name, manufactured by Sanyo Chemical Industries, Ltd.))

Hexaoxypropyleneglyceryl ether (having an SP value of 23.2, for example SANNIX GP-400 (NEWPOL GP-400) (trade name, manufactured by Sanyo Chemical Industries Ltd.))

Nonaoxypropyleneglyceryl ether (having an SP value of 21.7, for example NEWPOL GP-600 (trade name, manufactured by Sanyo Chemical Industries Ltd.))

Heptaoxypropyleneglycol (having an SP value of 21.2, for example NEWPOL PP-400 (trade name, manufactured by Sanyo Chemical Industries Ltd.))

Dioxyethylene dioxypropylene butyl ether (having an SP value of 20.1, for example SANNIX 50HB-55 or NEWPOL 50HB-55 (trade names, manufactured by Sanyo Chemical Industries, Ltd.))

Pentaoxyethylene pentaoxypropylene butyl ether (having an SP value of 18.8, for example NEWPOL 50HB-100 (trade name, manufactured by Sanyo Chemical Industries Ltd.))

Decaoxyethylene heptaoxypropylene butyl ether (having an SP value of 18.8, for example NEWPOL 50HB-260 (trade name, manufactured by Sanyo Chemical Industries Ltd.))

Dodecaoxyethylene dodecaoxypropylene butyl ether (having an SP value of 18.8, for example NEWPOL 50HB-400 (trade name, manufactured by Sanyo Chemical Industries Ltd.))

The content of the first water-soluble organic solvent in the inkjet recording liquid according to the invention is not particularly limited. In consideration of the curl suppression effect and jetting stability, the content of the first water-soluble organic solvent in the inkjet recording liquid is preferably from 1 mass % to 40 mass %, more preferably 5 mass % or more but less than 30 mass %, and still more preferably from 5 mass % to 25 mass %, with respect to the total mass of the ink recording liquid.

The first water-soluble organic solvent in the inkjet recording liquid according to the invention preferably includes, at a content of from 1 to 40 mass % with respect to the total amount of the ink recording liquid, at least one water-soluble organic solvent selected from trioxypropylene glyceryl ether, hexaoxypropyleneglyceryl ether, nonaoxypropyleneglyceryl ether, heptapropyleneglycol, dioxyethylene dioxypropylene butyl ether, pentaoxyethylene pentaoxypropylene butyl ether, decaoxyethylene heptaoxypropylene butyl ether or dodecaoxyethylene dodecaoxypropylene butyl ether. The first water-soluble organic solvent more preferably includes, at a content of from 5 mass % to 35 mass % with respect to the total mass of the ink recording liquid, at least one water-soluble organic solvent selected from trioxypropylene glyceryl ether, hexaoxypropyleneglyceryl ether, nonaoxypropyleneglyceryl ether, heptapropyleneglycol, dioxyethylene dioxypropylene butyl ether or dodecaoxyethylene dodecaoxypropylene butyl ether.

The inkjet recording liquid according to the invention optionally includes at least one water-soluble organic solvent (hereinafter referred to as "second water-soluble organic solvent") that has an SP value of 27.5 or less and that is different from the first water-soluble organic solvent.

In the inkjet recording liquid according to the invention, the total of the content of the first water-soluble organic solvent and the content of the second water-soluble organic solvent is 70 mass % or more with respect to the total amount of water-soluble organic solvent.

In the invention, the content of the second water-soluble organic solvent is not particularly limited as long as the total of the content of the second water-soluble organic solvent and the first water-soluble organic solvent is 70 mass % or more with respect to the total amount of water-soluble organic solvent and the content of the first water-soluble organic solvent with respect to the total amount of the first water-soluble organic solvent and the second water-soluble organic solvent is 70 mass % or more. From the viewpoint of the curl suppression effect, the content of the second water-soluble organic solvent is preferably from 0 to 5 mass %, and more preferably from 0 to 3 mass %, with respect to the total mass of the inkjet recording liquid.

The second water-soluble organic solvent in the invention is not particularly limited as long as its SP value is 27.5 or less. The SP value of the second water-soluble organic solvent is preferably from 16 to 27.5, and more preferably from 18 to 26.5. When the SP value of the second water-soluble organic solvent is more than 27.5, the curl suppression effect is decreased.

In the invention, the second water-soluble organic solvent may include two or more compounds. In any case, the total amount of the compound(s) having an SP value of 27.5 or less is 70 mass % or more, and preferably 90 mass % or more, with respect to the total amount of water-soluble organic solvent in the ink recording liquid.

Specific examples of the second water-soluble organic solvent are shown below. However, the invention is not limited thereto. The SP values are shown within the parentheses.

Diethyleneglycol monoethyl ether (DEGmEE) (22.4)
Diethyleneglycol monobutyl ether (DEGmBE) (21.5)
Diethyleneglycol diethyl ether (DEGdEE) (16.8)
Triethyleneglycol monobutyl ether (TEGmBE) (21.1)
Propyleneglycol monoethyl ether (PGmEE) (22.3)
Dipropyleneglycol (DPG) (27.1)
Dipropyleneglycol monomethyl ether (DPGmME) (21.3)
Tripropylene glycol (TPG) (24.7) (for example, NEWPOL PP-200 (trade names), manufactured by Sanyo Chemical Industries, Ltd.)
1,2-hexanediol (27.4)

In addition to the first and second water-soluble organic solvents, the inkjet recording liquid of the invention may further contain a third water-soluble organic solvent other than the first and second water-soluble organic solvents as long as there is no adverse influence on effects of the invention.

When the inkjet recording liquid contains the third water-soluble organic solvent in addition to the first and second water-soluble organic solvents, the anti-drying effect, the wetting effect, or the penetration accelerating effect can more easily obtained.

The anti-drying effect or the wetting effect means, for example, an effect of preventing clogging of an ink ejection opening of a nozzle due to drying of the inkjet ink. As the anti-drying agent or the wetting agent, a water-soluble organic solvent having a lower vapor pressure than that of water is preferable.

The penetration accelerating effect means an effect of facilitating infiltration of the ink into paper, and a water-soluble organic solvent is preferably used as a penetration accelerator.

Examples of the third water-soluble organic solvent include polyhydric alcohols including glycerin, 1,2,6-hexanetriol, trimethylolpropane, and alkanediols such as ethyleneglycol, propyleneglycol, diethyleneglycol, triethyleneglycol, tetraethyleneglycol, pentaethyleneglycol, 2-butene-1,4-diol, 2-ethyl-1,3-hexanediol, 2-methyl-2,4-pentanediol, 1,2-octanediol, 1,2-pentanediol, or 4-methyl-1,2-pentanediol; alkyl alcohols having 1 to 4 carbon atoms such as ethanol, methanol, butanol, propanol or isopropanol; glycol ethers such as ethyleneglycol monomethyl ether, ethyleneglycol monoethyl ether, ethyleneglycol monobutyl ether, ethyleneglycol monomethyl ether acetate, ethyleneglycol mono-iso-propyl ether, ethyleneglycol mono-n-butyl ether, ethyleneglycol mono-t-butyl ether, or 1-methyl-1-methoxybutanol; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. These solvents may be used singly, or in combination of two or more thereof.

When the third water-soluble organic solvent is used for the purpose of an anti-drying agent or a wetting agent, the third water-soluble organic solvent is preferably a polyhydric alcohol, and examples thereof include glycerin, ethyleneglycol, diethyleneglycol, triethyleneglycol, propyleneglycol, dipropyleneglycol, 1,3-butanediol, 2,3-butanediol, 1,4-butanediol, 3-methyl-1,3-butanediol, 1,5-pentanediol, tetraethyleneglycol, 1,6-hexanediol, 2-methyl-2,4-pentanediol, polyethyleneglycol, 1,2,4-butanetriol, and 1,2,6-hexanetriol. The third water-soluble organic solvent as an anti-drying agent or a wetting agent may be used singly, or in combination of two or more thereof.

When the third water-soluble organic solvent is used for the purpose of a penetrating agent, the third water-soluble organic solvent is preferably a polyol compound. Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol or 2,2,4-trimethyl-1,3-pentanediol. Among these compounds, 2-ethyl-1,3-hexanediol and 2,2,4-trimethyl-1,3-pentanediol are preferable.

The third water-soluble organic solvent used in the invention may be used singly, or two or more kinds thereof may be mixed and used.

In consideration of the stability and jetting property of the inkjet recording liquid, the total content of water-soluble solvent is preferably from 1 mass % to 40 mass %, more preferably from 5 mass % to 30 mass %, and particularly preferably from 10 mass % to 25 mass %, with respect to the total mass of the inkjet recording liquid.

The addition amount of water used in the inkjet recording liquid of the invention is not particularly limited. The addition amount of water is preferably from 10 to 99 mass %, more preferably from 30 to 80 mass % and still more preferably from 50 to 70 mass %.

Water-Soluble Organic Compound

In consideration of the ink jetting property, it is preferable for the inkjet recording liquid of the invention to further include at least one kind of a water-soluble organic compound represented by the following Formula (2):

$$R^1\text{-}A_m\text{-OH} \qquad \text{Formula (2)}$$

In Formula (2), $R^1$ represents a hydrogen atom, an alkyl group having 1 to 4 carbon atoms, or a group derived from a sugar alcohol having 3 to 12 carbon atoms; each A independently represents an ethyleneoxy group or a propyleneoxy group; and m represents an integer of from 35 to 355. In Formula (2), $A_m$ may include only ethyleneoxy groups or only propyleneoxy groups, or include at least one ethyleneoxy group and at least one propyleneoxy group.

The water-soluble organic compound in the invention is a compound that is liquid or solid at normal temperature and that can dissolve by 5 g or more in 100 g of water.

In the water-soluble organic compound in the invention, from the viewpoint of stability and jetting property, it is preferable that $R^1$ represents a hydrogen atom and m is from 40 to 190, and it is more preferable that $R^1$ represents a hydrogen atom and m is from 55 to 65.

Examples of the water-soluble organic compound include polyoxyethylene (10) polyoxypropylene (30) glycol (for example NEWPOL PE-62 (trade name, manufactured by Sanyo Chemical Industries Ltd.)), polyoxyethylene (25) polyoxypropylene (30) glycol (for example NEWPOL PE-64 (trade name, manufactured by Sanyo Chemical Industries Ltd.)), polyoxyethylene (300) polyoxypropylene (55) glycol (for example NEWPOL PE-108 (trade name, manufactured by Sanyo Chemical Industries Ltd.)), polyethyleneglycol 1540 (for example PEG-1540 (trade name, manufactured by Sanyo Chemical Industries Ltd.)), polyethyleneglycol 2000 (for example PEG-2000 (trade name, manufactured by Sanyo Chemical Industries Ltd.)) and polyethyleneglycol 20000 (for example PEG-20000 (trade name, manufactured by Sanyo Chemical Industries Ltd.)).

Note that, polyoxyethylene (10) polyoxypropylene (30) glycol represents a glycol compound copolymer consisting of an average of 10 structural units derived from ethylene oxide and an average of 30 structural units derived from propylene oxide. The other water-soluble organic compounds are defined in the same way.

In the invention, the content of the water-soluble organic compound is not particularly limited. From the viewpoint of stability and jetting property, the content of the water-soluble organic compound is preferably from 0 to 5 mass %, and more preferably from 0 to 3 mass %, with respect to the total amount of the inkjet recording liquid.

Colorant

The inkjet recording liquid of the invention contains at least one colorant (hereinafter, may be referred to as "coloring agent"). As the colorant, any colorant is usable as long as it has a function of forming an image by coloring, and a pigment, a dye or a color particle may be used. Among these, a water-dispersible pigment is preferable.

Examples of the water-dispersible pigments include following classes (1) to (4):

(1) An encapsulated pigment, that is, a polymer emulsion formed by incorporating a pigment into polymer particles; more specifically, in the polymer emulsion, pigment particles are dispersed in water and have a resin layer formed of a hydrophilic water-insoluble resin that covers the surfaces of the pigment particles and imparts hydrophilicity to the pigment particles;

(2) A self-dispersing pigment, that is, a pigment having at least one type of hydrophilic group on a surface thereof and exhibiting at least one of water-dispersibility or water-solubility in the absence of a dispersant; more specifically, the pigment is prepared by subjecting the surfaces of pigment particles (such as carbon black particles) to an oxidizing treatment so as to impart hydrophilicity to the pigment particles and so as to enable the pigment itself to disperse in water;

(3) A resin dispersed pigment, that is, a pigment dispersed using a water-soluble polymer compound having a weight average molecular weight of 50,000 or less; and (4) A surfactant-dispersed pigment, that is, a pigment dispersed using a surfactant.

Among these pigments, (1) an encapsulated pigment and (2) a self-dispersing pigment are preferable, and (1) an encapsulated pigment is particularly preferable.

In the following, the encapsulated pigment will be described in detail.

The resin used in the encapsulated pigment is not specifically limited, but is preferably a polymer compound that is self-dispersing or dissolvable in a mixed solvent of water and a water-soluble organic solvent and that has an anionic (acidic) group. In general, the number average molecular weight of the resin is preferably in the range of about 1000 to about 100,000, and particularly preferably in the range of about 3000 to about 50,000. The resin is preferably a resin that can dissolve in an organic solvent to form a solution. When the number average molecular weight of the resin is within the above ranges, the resin can exhibit sufficient function as a cover layer on pigment particles or as a coated layer on an ink component in an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkyd co-condensed resin, a urea formaldehyde resin, or a urea resin; and copolymers or mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic acid group. Among these monomers, an acrylic monomer having a carboxyl group is preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the invention, the encapsulated pigment can be manufactured by the methods described in JP-A Nos. 9-151342, 10-140065, 11-209672, 11-172180, 10-25440, or 11-43636.

In the invention, the colorant is preferably an encapsulated pigment (water-dispersible pigment) obtained by dispersing a colorant by a phase-inversion method.

The phase-inversion method is a self-dispersing method (an inversion-emulsification method), which may include, for example, dispersing a mixture of a pigment and a water-soluble or self-dispersing resin in water; this "mixture" refers to a state in which the components in an undissolved state are mixed, or a state in which the components are dissolved and mixed, or a state including both of the above states. A more specific production method using the phase-inversion method may be similar to that described in JP-A No. 10-140065.

In the present invention, a self-dispersing pigment is an example of a preferable pigment. A self-dispersing pigment is a pigment in which a number of hydrophilic functional groups and/or a salt thereof (hereinafter, referred to as a dispersibility-imparting group) are directly or indirectly (via an alkyl group, an alkyl ether group, an aryl group or the like) bonded to the surfaces of particles of the pigment, so that the pigment particles can be dispersed in an aqueous medium without a dispersant. Here, the term "dispersed in an aqueous medium without a dispersant", indicates a state in which the pigment particles are dispersible in the aqueous medium even when a dispersant for dispersing the pigment is not used.

An ink containing a self-dispersing pigment as a colorant does not need to contain a dispersant, which is otherwise contained for dispersing a usual pigment. Therefore, the ink containing a self-dispersing pigment is free from decrease in defoaming properties due to a dispersant, and generation of foam is hardly observed in the ink containing a self-dispersing pigment; accordingly an ink with excellent ink jetting stability can be easily prepared.

Examples of dispersibility-imparting groups to be bonded to the surfaces of self-dispersing pigment particles include —COOH, —CO, —OH, —$SO_3H$, —$PO_3H_2$, and a quaternary ammonium, and salts thereof. A self-dispersing pigment can be manufactured by subjecting a pigment as a raw material to a physical or chemical treatment so as to bond (graft) a dispersibility-imparting group or an active species having a dispersibility-imparting group to the surfaces of the pigment particles.

Examples of the physical treatment include a vacuum plasma treatment. Examples of the chemical treatment include a wet oxidizing method in which surfaces of pigment particles are oxidized by an oxidizing agent in water and a method in which p-aminobenzoic acid is bonded to surfaces of pigment particles whereby a carboxyl group is linked to the pigment particles through the phenyl group of p-aminobenzoic acid.

In the invention, preferable examples of the self-dispersing pigment include a self-dispersing pigment whose surface has been subjected to an oxidation treatment with a hypohalous acid and/or hypohalite and a self-dispersing pigment whose surface has been subjected to an oxidation treatment with ozone. Commercially available products may also be used as the self-dispersing pigment. Examples thereof include, MICROJET CW-1 (trade name, manufactured by Orient Chemical Industry), and CAB-O-JET200 and CAB-O-JET300 (trade names, manufactured by Cabot Corporation).

Pigment

The pigment used in the invention is not specifically limited, and may be appropriately selected depending on the purposes. For example, the pigment may be either an organic pigment or an inorganic pigment, or both.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinophthalone pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

Examples of black pigments include carbon blacks such as RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 or RAVEN700 (trade names, manufactured by Columbian Chemicals Co.); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 or MONARCH 1400 (trade names, manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A or SPECIAL BLACK 4 (trade names, manufactured by Degussa); No. 25, No. 33, No. 40, No. 45, No. 47, No. 52, No. 900, No. 2200B, No. 2300, MCF-88, MA600, MA7, MA8 or MA100 (trade names, manufactured by Mitsubishi Chemical Corporation). However, in the invention, the black pigments are not limited thereto.

Organic pigments usable in the invention include yellow ink pigments such as C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 or 180.

Organic pigments usable in the invention further include magenta ink pigments such as C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 or C.I. pigment violet 19. Among these pigments, C.I. pigment red 122 is particularly preferable.

Furthermore, organic pigments usable in the invention further include cyan ink pigments such as C.I. Pigment Blue 1, 2, 3, 15, 15:1, 15:2, 15:3, 15:34, 16, 17:1, 22, 25, 56, 60, C.I. Bat Blue 4, 60 or 63. Among these pigments, C. I. Pigment Blue 15:3 is particularly preferable.

The pigment may be used singly or in combination of two or more thereof, each of which may be selected from the above classes of pigments and may belong to the same class as each other or different classes from each other.

Dispersant

In the invention, the dispersant used in an encapsulated pigment or a resin dispersed pigment may be selected from a nonionic compound, an anionic compound, a cationic compound, or an amphoteric compound.

The dispersant is, for example, a copolymer formed from monomers having an $\alpha,\beta$-ethylenic unsaturated group. Examples of the monomers having an $\alpha,\beta$-ethylenic unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bismethacryloxyethyl phosphate, methacryloxyethylphenyl acid phosphate, ethyleneglycol dimethacrylate, diethyleneglycol dimethacrylate, styrene, styrene derivatives such as a-methyl styrene or vinyltoluene; vinyl cyclohexane, vinyl naphthalene, vinyl naphthalene derivatives, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and derivatives of the above compounds.

A homopolymer formed by polymerization of one kind of monomer having an $\alpha,\beta$-ethylenic unsaturated group, which may be selected from the above monomers, or a copolymer formed by copolymerization of plural kinds of monomer having an $\alpha,\beta$-ethylenic unsaturated group, each of which may be selected from the above monomers, may be used as a polymer dispersant.

Examples of the dispersant include an alkyl acrylate-acrylic acid copolymer, an alkyl methacrylate-methacrylic acid copolymer, a styrene-alkyl acrylate-acrylic acid copolymer, a styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, a polyester, and polyvinyl alcohol.

The dispersant used in the invention is preferably a dispersant having a weight-average molecular weight of from 2000 to 60,000. The ratio of the addition amount of the dispersant to the pigment is preferably from 10% to 100%, more preferably from 20% to 70% and still more preferably from 40% to 50%, based on the mass.

The content of the colorant in the inkjet recording liquid of the invention is preferably from 0.1 to 15 mass %, and more preferably from 1 to 10 mass %, in consideration of image density and image storage stability.

Surfactant

The inkjet recording liquid of the invention may contain at least one surfactant. By adding the surfactant, the surface tension of the inkjet recording liquid can be adjusted. Any of a nonionic surfactant, a cationic surfactant, an anionic surfactant or a betaine surfactant can be used. In order for the ink of the invention to be satisfactorily applied by an inkjet system, the addition amount of the surfactant is such an amount that the surface tension of the inkjet recording liquid of the invention at 25° C. is adjusted preferably to a range of from 20 mN/m to 60 mN/m, more preferably from 20 mN/m to 45 mN/m, and still more preferably from 25 mN/m to 40 mN/m.

As the surfactant in the invention, a compound having a structure in which a hydrophilic moiety and a hydrophobic moiety are included in the molecule thereof can be effectively used. Any of an anionic surfactant, a cationic surfactant, an amphoteric surfactant, or a nonionic surfactant can be used. Furthermore, the above-mentioned polymer substance (polymer dispersant) is also usable as a surfactant.

Examples of the anionic surfactant include sodium dodecylbenzene sulfonate, sodium lauryl sulfate, a sodium alkyl diphenyl ether disulfonate, a sodium alkylnaphthalene sulfonate, a sodium dialkyl sulfosuccinate, sodium stearate, potassium oleate, sodium dioctylsulfosuccinate, a sodium polyoxyethylene alkyl ether sulfate, a sodium polyoxyethylene alkylphenyl ether sulfate, sodium dialkylsulfosuccinate, sodium stearate, sodium oleate, and sodium t-octylphenoxyethoxy-polyethoxyethyl sulfate. The surfactant may be used singly, or in combination of two or more thereof.

Examples of the nonionic surfactant include polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of the cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

The addition amount of surfactant to be added to the inkjet recording liquid of the invention is not specifically limited, but is preferably from 1 mass % or more, more preferably from 1 to 10 mass %, and even more preferably from 1 to 3 mass % with respect to the total amount of the inkjet recording liquid.

Resin Particles

The inkjet recording liquid according to the invention preferably includes at least one type of resin particles. When the inkjet recording liquid includes the resin particles, the fixability of the inkjet recording liquid to a recording medium can be improved. Preferable examples of the resin particles include particles of any of the following: an acrylic resin, a vinyl acetate resin, a styrene-butadiene resin, a vinyl chloride resin, an acrylate-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin, or a fluororesin. Among them, the resin particles of an acrylic resin, an acrylate-styrene resin, a styrene resin, a crosslinked acrylic resin, and a crosslinked styrene resin are preferable.

The weight average molecular weight of the resin particles is preferably from 10,000 to 200,000, and more preferably from 100,000 to 200,000.

The average particle diameter of the resin particles is preferably from 10 nm to 1 μm, more preferably from 10 nm to 200 nm, even more preferably from 20 nm to 100 nm and particularly preferably from 20 nm to 50 nm.

The glass transition temperature Tg of the resin particles is preferably 30° C. or more, more preferably 40° C. or more, and even more preferably 50° C. or more.

The addition amount of the resin particles is preferably from 0.5 mass % to 20 mass %, more preferably from 3 mass % to 20 mass %, and even more preferably from 5 mass % to 15 mass %, with respect to the total amount of the inkjet recording liquid.

The particle diameter distribution of the resin particles is not particularly limited, and may be a broad particle diameter distribution or a mono-dispersed particle diameter distribution. It is possible to use a mixture of two or more types of water-insoluble particles. It is also possible to use a mixture of two or more types of resin particles each having a mono-dispersed particle size distribution.

Other Components

The inkjet recording liquid of the invention may contain other additives. Examples of other additives include known additives such as an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer, a chelating agent, and a solid wetting agent.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

As anti-fading agents, various organic anti-fading agents and metal complex anti-fading agents can be used. Examples of the organic anti-fading agents include hydroquinones, alkoxyphenols, dialkoxyphenols, phenols, anilines, amines, indans, chromanes, alkoxy anilines, and heterocycles. Examples of the metal complex anti-fading agents include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the inkjet recording liquid is preferably from 0.02 to 1.00 mass %.

The pH adjuster is not specifically limited as long as the pH adjuster can adjust a pH value to a desired value without exerting an adverse influence on an inkjet recording liquid to which the pH adjuster is added. The pH adjuster may be selected appropriately in accordance with the purpose. Examples of the pH adjuster include alcohol amines (such as diethanlol amine, triethanol amine or 2-amino-2-ethyl-1,3-propanediol); alkali metal hydroxides (such as lithium hydroxide, sodium hydroxide or potassium hydroxide); ammonium hydroxides (such as ammonium hydroxide or quaternary ammonium hydroxide); phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

Examples of the solid wetting agent, which is an agent wetting a surface of a solid (e.g., a pigment), include saccharides such as glucose, mannose, fructose, ribose, xylose, arabinose, galactose, aldonic acid, glucitol, maltose, cellobiose, lactose, sucrose, trehalose or maltotriose; sugar alcohols; hyaluronic acids; and ureas.

Physical Properties of Inkjet Recording Liquid

The surface tension of the inkjet recording liquid of the invention at 20° C. is preferably from 20 mN/m to 60 mN/m, more preferably from 20 mN/m to 45 mN/m, and still more preferably from 25 mN/m to 40 mN/m. The surface tension may be adjusted to the desired range, for example, by containing a surfactant.

From the view point of jetting properties, the viscosity of the inkjet recording liquid of the invention at 20° C. is preferably from 5 mPa·s to 20 mPa·s, more preferably from 5.5 mPa·s to less than 18 mPa·s, and still more preferably from 6 mPa·s to less than 16 mPa·s. The viscosity of the inkjet recording liquid of the invention at 40° C. is preferably from 3 mPa·s to 15 mPa·s, more preferably from 3.5 mPa·s to less than 12 mPa·s, and still more preferably from 4 mPa·s to less than 10 mPa·s. The viscosity may be adjusted to the desired range, for example, by modifying the molecular weight and content of the water-soluble organic solvents. Since the inkjet recording liquid of the invention contains the first water-soluble organic solvent, the viscosity of the inkjet recording liquid can be adjusted to the desired range more easily.

Inkjet Recording Method

In a preferable inkjet recording method in the invention, energy is supplied to an inkjet recording liquid to form an image on a known image receiving material such as plain paper, resin coated paper, inkjet paper as those described in JP-A Nos. 8-169172, 8-27693, 2-276670, 7-276789, 9-323475, 62-238783, 10-153989, 10-217473, 10-235995, 10-337947, and 10-217597, a film, electrophotographic common paper, fabrics, glass, metal or ceramics. In addition, as an inkjet recording method applied to the invention, the inkjet recording method described in the paragraphs [0093] to [0105] of JP-A No. 2003-306623 is preferable.

When forming an image, a polymer latex compound may be used together for the purpose of imparting glossiness and water resistance or of improving weather-resistance. The time when the latex compound is added to the image receiving material may be before, after, or simultaneously with application of a colorant. Accordingly, the latex compound may be added to an image receiving paper or added to an ink, or may be used as an independent liquid of the polymer latex. More specifically, methods described in JP-A Nos. 2002-166638, 2002-121440, 2002-154201, 2002-144696 and 2002-080759 can be preferably used.

A preferable example of an image forming method using the inkjet recording liquid of the invention is an inkjet recording method including the following processes:

a first process, being a process of applying a printability-improving liquid composition onto a recording medium;

a second process, being a process of applying an inkjet recording liquid onto the recording medium onto which the liquid composition has been applied; and other additional processes, which are not particularly limited, and may be suitably selected according to the purpose.

Examples of the additional processes include a drying and removing process, and a heating and fixing process. The drying and removing process is not specifically restricted as long as the ink solvent in the inkjet recording liquid that is applied to a recording medium can be dried and removed by the process, and the process may be suitably selected according to the purpose. The heating and fixing process is not specifically restricted as long as resin particles contained in the inkjet recording liquid used in the inkjet recording method are fused and fixed in the process, and the process may be suitably selected according to the purpose.

Another example of a preferable image forming system in the invention includes:

a first process, being a process of applying a printability-improving liquid composition onto an intermediate transfer medium;

a second process, being a process of applying an inkjet recording liquid onto the intermediate transfer medium onto which the liquid composition has been provided;

a third process, being a process of transferring an ink image formed on the intermediate transfer medium onto a recording medium; and other additional processes, which are not particularly limited, and may be suitably selected according to the purpose. Examples of the additional processes include a drying and removing process, and a heating and fixing process.

Printability-Improving Liquid Composition

Preferable examples of the inkjet recording method using the inkjet recording liquid of the invention include an inkjet recording method including a process of applying a printability-improving liquid composition onto a recording medium.

Preferable examples of the printability-improving liquid composition include a liquid composition that, when mixed with an ink, causes aggregation by changing the pH of the ink. The pH of the liquid composition is preferably from 1 to 6, more preferably from 2 to 5, and still more preferably from 3 to 5.

A preferable example of the printability-improving liquid composition that can be used in the invention is a process liquid containing a multivalent metal salt or a polyallylamine.

The printability-improving liquid composition may include a component that causes aggregation of the pigment, and examples of the component includes a polyvalent metal salt, an organic acid, a polyallylamine, and derivatives thereof.

Examples of the polyvalent metal salt include a metal salt of any of the following: a salt of an alkaline earth metal belonging to Group 2 of the Periodic Table (for example, magnesium or calcium), a salt of a transition metal belonging to Group 3 of the Periodic Table (for example, lanthanum), a salt of a cation derived from an element belonging to Group 13 of the Periodic Table (for example aluminum), or a salt a lanthanide (for example neodymium). Preferable examples of the metal salt include a carboxylate (for example, a formate, an acetate, or a benzoate), a nitrate, a chloride, or a thiocyanate. Among them, more preferable examples include a calcium or magnesium salt of a carboxylic acid (such as formic acid, acetic acid, or benzoic acid), a calcium or magnesium salt of nitric acid, calcium chloride, magnesium chloride, and a calcium or magnesium salt of thiocyanic acid.

The organic acid is preferably selected, for example, from the following: polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives thereof, and salts thereof.

The component that causes aggregation of the pigment may be used singly or in combination of two or more thereof.

The content of the component that causes aggregation in the printability-improving liquid is preferably from 1 mass % to 10 mass %, more preferably from 1.5 mass % to 7 mass %, and still more preferably from 2 mass % to 6 mass %.

EXAMPLES

Hereinafter, the invention will be described in more detail with reference to examples, but the invention is not limited to the examples. Further, "parts" and "%" are expressed in terms of mass, unless otherwise specified.

Example 1

Preparation of Inkjet Recording Liquid
Preparation of Pigment (Colorant) Dispersion Liquid
Preparation of Polymer Dispersant P-1

Methyl ethyl ketone (88 g) was placed in a 1000 ml three-neck flask equipped with a stirrer and a condenser tube, and heated to 72° C. under a nitrogen atmosphere. Separately, 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone to form a mixed solution. The solution was added dropwise to the liquid in the flask over three hours. After the dropwise addition was completed, the reaction was further continued for one hour. Then, a solution obtained by dissolving 0.42 g of dimethyl 2,2'-azobisisobutyrate in 2 g of methyl ethyl ketone was added to the reaction solution, and the reaction solution was heated to 78° C. and heated at the temperature for 4 hours. The obtained reaction solution was reprecipitated twice with an excess quantity of hexane, and the precipitated resin was dried, whereby 96 g of dispersant P-1 was obtained.

Subsequently, the composition of the obtained resin was identified with $^1$H-NMR. The weight average molecular weight (Mw) was determined by a GPC method, and found to be 44,600. Furthermore, the acid value of the polymer was obtained in accordance with the method described in JIS Standard (JIS-K0070 (1992), the disclosure of which is incorporated by reference herein), and was found to be 65.2 mg KOH/g.

Preparation of Cyan Dispersion 10 parts by mass of Pigment blue 15:3 (Phthalocyanine Blue A220 (trade name), manufactured by Dainichiseika Color & Chemicals Mfg. Co., Ltd.), 5 parts by mass of the polymer dispersant P-1, 42 parts by mass of methyl ethyl ketone, 5.5 parts of an aqueous solution of NaOH (1 mol/L), and 87.2 parts of ion-exchanged water were mixed, and the mixture was dispersed by a bead mill for 2 to 6 hours using zirconia beads with a diameter of 0.1 mmφ.

Methyl ethyl ketone was removed from the obtained dispersion at 55° C. under reduced pressure, and a part of water was removed, whereby a cyan dispersion liquid with a pigment concentration of 10.2 mass % was obtained.

Thus, as a colorant, the cyan dispersion liquid was prepared.

The ingredients described below were mixed to have the final compositional ratio described below, using the colorant (the cyan dispersion liquid) obtained above, the first water-soluble organic solvent, the surfactant and water. The obtained mixture was passed through a membrane filter having a pore size of 5 μm, whereby Ink-1 (inkjet recording liquid) was obtained.

Composition of Ink-1

| | |
|---|---|
| Cyan pigment (pigment blue 15:3) | 4% |
| Polymer dispersant P-1 | 2% |
| SANNIX (NEWPOL) 50HB-55 (first water-soluble organic solvent) | 15% |
| (trade name, manufactured by Sanyo Chemical Industries, Ltd.) | |
| SANNIX (NEWPOL) GP-250 (first water-soluble organic solvent) | 15% |
| (trade name, manufactured by Sanyo Chemical Industries, Ltd.) | |
| OLFINE E1010 (surfactant) | 1% |
| (trade name, manufactured by Nissin Chemical Industry Co., Ltd.) | |
| Ion-exchanged water | 63% |

Example 2

Ink-2 to Ink-16 were prepared in the same manner as in Example 1, except that the kind and content amount of the first water-soluble organic solvent, and/or the kind and content amount of the second water-soluble organic solvent, the third water-soluble organic solvent and the water-soluble organic compound (hereinafter sometimes referred to as "another water-soluble organic solvent") were changed as shown in Table 1.

Example 3

Preparation of Resin Particle Dispersion

A mixed solution of 2353 g of JONCRYL 537 (trade name, manufactured by BASF Japan Ltd.; concentration: 45.9%), 1080 g of sodium oleate and 167 g of ion-exchanged water was prepared in a reaction vessel. The obtained mixed solution was centrifuged at 13,000 rpm for 60 minutes and the supernatant liquid recovered, whereby the resin particle dispersion was obtained.

A part of the resin particle dispersion thus obtained was dried in a vacuum at a temperature of 120° C. for 2 hours and the solid content thereof was measured. The solid content concentration of the resin particle dispersion was found to be 31%.

The ingredients described below, in the compositional ratio described below, were mixed to prepare Ink-17 (inkjet recording liquid) containing resin particles, using the cyan dispersion liquid and the resin particle dispersion obtained above.

Composition of Ink-17

| | |
|---|---|
| Cyan pigment (pigment blue 15:3) | 4% |
| Polymer dispersant P-1 | 2% |
| Resin particle dispersion (prepared above) (solid content) | 8% |
| SANNIX (NEWPOL) GP-400 (first water-soluble organic solvent) | 15% |
| (trade name, manufactured by Sanyo Chemical Industries, Ltd.) | |
| OLFINE E1010 (surfactant) | 1% |
| (trade name, manufactured by Nissin Chemical Industry Co., Ltd.) | |
| Ion-exchange water | 70% |

Example 4

Ink-18 to Ink-20 containing the resin particle dispersion were prepared in the same manner as in Example 3, except that the kind and content amount of the first water-soluble organic solvent and another water-soluble organic solvent were changed as shown in Table 1.

Comparative Example 1

Ink-21 to Ink-27 were prepared in the same manner as in Example 1, except that the kind and content amount of the first water-soluble organic solvent and another water-soluble organic solvent were changed as shown in Table 1.

Evaluation

Curling Property

Strips of sample paper each having a size of 5 mm×50 mm were prepared by cutting TOKUHISHI ART double-sided N paper (trade name, manufactured by Mitsubishi Paper Mills, Ltd.) (basis weight: 84.9 g/m²) such that when any of the strips curled, the curling direction would be the length direction of the strip. The inkjet recording liquids prepared above (Ink-1 to Ink-27) were applied onto respectively different sample paper strips using an application bar in a coating amount of 4 g/m². Then, Curvature C of each sample paper strip was measured in the following manner. The evaluation results of curling property in accordance with the following criteria are shown in Table 1.

Method of Measuring Curvature

Curvature C of the sample on which the inkjet recording liquid had been applied was measured under conditions of a temperature of 25° C. and a relative humidity of 50%. Here, the curl of the sample was regarded as an arc of a circle with a radius of R, and the curl value was calculated according to the equation, $C=1/R(m)$.

Evaluation Criteria

A: Curvature C ten minutes after ink application did not exceed 20

B: Curvature C ten minutes after ink application exceeded 20, but Curvature C one day after ink application did not exceed 20

C: Curvature C one day after ink application exceeded 20, but Curvature C seven days after ink application did not exceed 20

D: Curvature C after 7 days of ink application exceeded 20

Storage Stability

Each of the obtained inkjet recording liquids (Ink-1 to Ink-27) was evaluated as follows. The temperature of the inkjet recording liquid was adjusted to 25° C. The viscosity of the undiluted ink liquid at 25° C. was measured with an vibratory viscometer (trade name: DV-II+VISCOMETER, manufactured by BROOKFIELD) under conditions of a temperature of 25° C. and a relative humidity of 50% on a cone plate (φ35 mm). Measurement data were obtained in a torque range of from 20% to 90% and a revolution number range of from 0.5 to 100 rpm, and the average value of the measurement data was used as a measured viscosity. The measured viscosity immediately after the preparation of the inkjet recording liquid was defined as ink viscosity 1.

Subsequently, a part of the inkjet recording liquid was placed in a sample bottle made of glass, and the bottle was sealed and left (stored) at 60° C. for 2 weeks. Thereafter, the viscosity after storage was measured by the same method as the above, and the obtained value was defined as ink viscosity 2. Simultaneously, the state of the ink liquid was visually inspected.

The ratio of change in the ink viscosity measured before and after storage was calculated by the following formula:

The ratio of change in the ink viscosity=100−((ink viscosity 2/ink viscosity 1)×100)

Ink storage stability was evaluated in accordance with the following evaluation criteria, also considering the result of visual inspection after storage.

Evaluation Criteria

A: The rate of change in the ink viscosity was less than ±15%, and a change in the ink recording liquid was not observed by visual inspection B: The rate of change in the ink viscosity was ±15% or more but less than ±30%, and a change in the ink recording liquid was not observed by visual inspection C: The rate of change in the ink viscosity was ±30% or more but less than ±50%, and a change in the ink recording liquid was not observed by visual inspection D: The rate of change in the ink viscosity was ±50% or more, or separation or gelation of the ink recording liquid was observed by visual inspection Jetting Stability The jetting stability of each of the obtained inkjet recording liquids (Ink 1 to Ink-27) was evaluated in the following manner. The evaluation conditions for the following evaluation item (i) were a temperature of 25° C. and a relative humidity of 50%, and the evaluation conditions for the following evaluation items (ii) and (iii) were a temperature of 40° C. and a relative humidity of 55%. In evaluation item (ii), the ejection nozzles were left uncapped for 30 minutes under conditions of a temperature of 40° C. and a relative humidity of 55%.

A DIMATIX MATERIAL PRINTER DMP-2831 (trade name, manufactured by Fujifilm Dimatix Inc.) equipped with a 10 pl ejection cartridge DIMATIX MATERIAL CARTRIDGE DMC-11610 (trade name, manufactured by Fujifilm Dimatix Inc.) was used as evaluation equipment, and the ink was evaluated with regard to the following evaluation items (i) to (iii). The evaluation results of jetting stability in accordance with the following criteria are shown in Table 1.

Here, the ink cartridge was modified to have a capacity of 100 ml for accommodating the liquid to be filled therein. As a recording medium, TOKUHISHI ART double-sided N paper (trade name, manufactured by Mitsubishi Paper Mills, Ltd.) (basis weight: 84.9 g/m$^2$) cut into a size of 5 mm×50 mm in the same manner as the above was used.

Evaluation Items (i) positive if no image unevenness was observed (ii) positive if, after ink is ejected continuously for one minute and then the ejection nozzles are left uncapped for 30 minutes, the ink jetting ratio was 90% or more (that is, the ratio of ink jetting failure was less than 10%), (iii) positive if, after 60-minute continuous ink ejection, the ink jetting ratio was 90% or more (that is, the ratio of ink jetting failure was less than 10%)

Evaluation Criteria

A: All of the items (i) to (iii) were positive

B: Only items (i) and (ii) were positive

C: Only item (i) was positive

D: None of the items (i) to (iii) was positive

TABLE 1

| | First Water-soluble Organic Solvent | | | | Another Water-soluble Organic Solvent | | | | Total |
|---|---|---|---|---|---|---|---|---|---|
| Ink | Solvent | MW | SP value | Solvent Amount (Relative To Ink) | Solvent | MW | SP value | Solvent Amount (Relative to Ink) | Solvent Amount (Relative to Ink) |
| 1 | 50HB-55 | 240 | 20.1 | 15% | — | — | — | — | 30% |
| | GP-250 | 250 | 26.4 | 15% | | | | | |
| 2 | GP-250 | 250 | 26.4 | 15% | — | — | — | — | 30% |
| | GP-400 | 400 | 23.2 | 15% | | | | | |
| 3 | GP-400 | 400 | 23.2 | 18% | — | — | — | — | 18% |
| 4 | PP-400 | 400 | 21.2 | 16% | — | — | — | — | 16% |
| 5 | GP-600 | 600 | 21.7 | 15% | — | — | — | — | 15% |
| 6 | 50HB-100 | 540 | 18.8 | 15% | — | — | — | — | 15% |
| 7 | 50HB-400 | 1340 | 18.8 | 14% | — | — | — | — | 14% |
| 8 | GP-400 | 400 | 23.2 | 15% | DEGmEE | 134 | 22.4 | 5% | 20% |
| 9 | 50HB-100 | 540 | 18.8 | 13% | DEGmEE | 134 | 22.4 | 5% | 18% |
| 10 | GP-400 | 400 | 23.2 | 15% | DEGmBE | 162 | 21.5 | 5% | 20% |
| 11 | GP-600 | 600 | 21.7 | 14% | DEGmBE | 162 | 21.5 | 5% | 19% |
| 12 | GP-400 | 400 | 23.2 | 15% | DEG | 106 | 30.6 | 5% | 20% |
| 13 | GP-400 | 400 | 23.2 | 30% | — | — | — | — | 30% |
| 14 | GP-400 | 400 | 23.2 | 35% | — | — | — | — | 35% |
| 15 | GP-400 | 400 | 23.2 | 18% | PE-64 | 2860 | 18.8 | 3% | 21% |
| 16 | GP-400 | 400 | 23.2 | 18% | PE-108 | 16500 | 19.0 | 1% | 19% |
| 17 | GP-400 | 400 | 23.2 | 15% | — | — | — | — | 15% |
| 18 | 50HB-100 | 540 | 18.8 | 15% | — | — | — | — | 15% |
| 19 | 50HB-400 | 1340 | 18.8 | 4% | PE-108 | 16500 | 19.0 | 1% | 5% |
| 20 | 50HB-400 | 1340 | 18.8 | 7% | PE-108 | 16500 | 19.0 | 1% | 8% |
| 21 | GP-400 | 400 | 23.2 | 18% | DEGmEE | 134 | 22.4 | 12% | 30% |
| 22 | — | — | — | — | DEGmEE | 134 | 22.4 | 35% | 35% |
| 23 | — | — | — | — | DEGmEE | 134 | 22.4 | 50% | 50% |
| 24 | — | — | — | — | TEGmBE | 206 | 21.1 | 35% | 35% |

TABLE 1-continued

| Ink | | | | | MW | SP | | |
|---|---|---|---|---|---|---|---|---|
| 25 | — | — | — | — | PEG1540 | 1450 | 20.3 | 15% | 15% |
| 26 | GP-400 | 400 | 23.2 | 16% | DEG | 106 | 30.6 | 8% | 24% |
| 27 | — | — | — | — | DEG | 106 | 30.6 | 25% | 25% |

| Ink | Amount of First Water-Soluble Organic Solvent (Relative to Solvent with SP value of 27.5 or less) | Amount of Solvent with SP value of 27.5 or less (Relative to Water-soluble Organic Solvent) | Curling Property | Storage stability | Jetting Property | Remarks |
|---|---|---|---|---|---|---|
| 1 | 100% | 100% | A | A | A | Invention |
| 2 | 100% | 100% | A | A | A | Invention |
| 3 | 100% | 100% | B | A | A | Invention |
| 4 | 100% | 100% | B | A | A | Invention |
| 5 | 100% | 100% | B | B | B | Invention |
| 6 | 100% | 100% | A | B | B | Invention |
| 7 | 100% | 100% | A | B | B | Invention |
| 8 | 75% | 100% | A | A | A | Invention |
| 9 | 72% | 100% | A | B | A | Invention |
| 10 | 75% | 100% | A | A | B | Invention |
| 11 | 74% | 100% | A | A | B | Invention |
| 12 | 100% | 75% | B | A | B | Invention |
| 13 | 100% | 100% | A | A | B | Invention |
| 14 | 100% | 100% | A | B | B | Invention |
| 15 | 86% | 100% | A | A | A | Invention |
| 16 | 95% | 100% | A | A | A | Invention |
| 17 | 100% | 100% | A | A | A | Invention |
| 18 | 100% | 100% | A | A | A | Invention |
| 19 | 80% | 100% | B | A | B | Invention |
| 20 | 88% | 100% | B | A | A | Invention |
| 21 | 60% | 100% | C | A | B | Comp. Ex. |
| 22 | 0% | 100% | C | B | C | Comp. Ex. |
| 23 | 0% | 100% | B | D | D | Comp. Ex. |
| 24 | 0% | 100% | C | D | C | Comp. Ex. |
| 25 | 0% | 100% | B | C | D | Comp. Ex. |
| 26 | 100% | 67% | C | A | C | Comp. Ex. |
| 27 | 0% | 0% | D | A | C | Comp. Ex. |

The meaning of the abbreviations in Table 1 is as follows:
MW: molecular weight
Comp. Ex.: Comparative Example
<First Water-soluble Organic Solvent>
50HB-55: dioxyethylene dioxypropylene butyl ether SAN-NIX (NEWPOL) 50HB-55 (trade name, manufactured by Sanyo Chemical Industries Ltd.)
50HB-100: pentaoxyethylene pentaoxypropylene butyl ether NEWPOL 50HB-100 (trade name, manufactured by Sanyo Chemical Industries Ltd.)
50HB-400: dodecaoxyethylene dodecaoxypropylene butyl ether NEWPOL 50HB-400 (trade name, manufactured by Sanyo Chemical Industries Ltd.)
GP-250: trioxypropylene glyceryl ether NEWPOL GP-250 (trade name, manufactured by Sanyo Chemical Industries, Ltd.)
GP-400: hexaoxypropylene glyceryl ether SANNIX (NEWPOL) GP-400 (trade name, manufactured by Sanyo Chemical Industries, Ltd
GP-600: nonaoxypropyleneglyceryl ether NEWPOL GP-600 (trade name, manufactured by Sanyo Chemical Industries Ltd.))
PP-400: heptaoxypropyleneglycol NEWPOL PP-400 (trade name, manufactured by Sanyo Chemical Industries Ltd.))
<Second Water-soluble Organic Solvent>
DEGmEE: diethyleneglycol monoethyl ether
DEGmBE: diethyleneglycol monobutyl ether
TEGmBE: triethyleneglycol monobutyl ether
PGmEE: propyleneglycol monoethyl ether
<Third Water-soluble Organic Solvent>
DEG: diethyleneglycol
<Water-soluble Organic Compound>
PE-64: polyoxyethylene (25) polyoxypropylene (30) glycol NEWPOL PE-64 (trade name, manufactured by Sanyo Chemical Industries Ltd.))
PE-108: polyoxyethylene (300) polyoxypropylene (55) glycol NEWPOL PE-108 (trade name, manufactured by Sanyo Chemical Industries Ltd.))
PEG1540: polyethyleneglycol 1540

As shown in Table 1, it was found that the inkjet recording liquid of the invention exhibits the excellent curl-suppression effects. It is also found that the ink storage stability and jetting stability of the inkjet recording liquid of the invention are excellent.

According to the invention, an inkjet recording liquid having an excellent storage stability and jetting stability can be obtained, with which occurrence of curling of a recording medium can be suppressed.

All publications, patent applications, and technical standards mentioned in this specification are herein incorporated by reference to the same extent as if such individual publication, patent application, or technical standard was specifically and individually indicated to be incorporated by reference.

What is claimed is:
1. An inkjet recording liquid, comprising:
    water;
    at least one colorant;
    resin particles; and
    a water-soluble organic solvent having an SP (solubility parameter) value of 27.5 or less at a content of 70 mass % or more with respect to the total amount of water-soluble organic solvent, wherein the water-soluble organic solvent having an SP value of 27.5 or less com- prises at least one water-soluble organic solvent having a molecular weight of from 240 to 1400 and represented by the following Formula (1) at a content of 70 mass % or more with respect to the amount of the water-soluble organic solvent having an SP value of 27.5 or less:

$$R\text{-}A_n\text{-}OH \qquad \text{Formula (1)}$$

wherein, in Formula (1), R represents a group derived from a glycerin;

each A independently represents an ethyleneoxy group or a propyleneoxy group; and n represents an integer of from 3 to 24;

wherein the content of the water-soluble organic solvent represented by Formula (1) is 5 mass % or more but less than 30 mass % with respect to the total mass of the ink recording liquid.

2. The inkjet recording liquid of claim 1, further comprising a water-soluble organic compound represented by the following Formula (2):

$$R^1\text{-}A_m\text{-}OH \qquad \text{Formula (2)}$$

wherein, in Formula (2), $R^1$ represents a hydrogen atom, an alkyl group having 1 to 4 carbon atoms, or a group derived from a sugar alcohol having 3 to 12 carbon atoms; each A independently represents an ethyleneoxy group or a propyleneoxy group; and m represents an integer of from 35 to 355.

3. The inkjet recording liquid of claim 1, wherein the viscosity of the inkjet recording liquid at 25° C. is from 5 mPa·s to 20 mPa·s.

4. The inkjet recording liquid of claim 1, wherein the viscosity of the inkjet recording liquid at 40° C. is from 3 mPa·s to 15 mPa·s.

5. The inkjet recording liquid of claim 1, wherein the colorant is a water-dispersible pigment.

6. The inkjet recording liquid of claim 1, wherein the resin particles comprise at least one resin selected from the group consisting of an acrylic resin, an acrylate-styrene resin, a styrene resin, a crosslinked acrylic resin and a crosslinked styrene resin.

7. The inkjet recording liquid of claim 1, wherein the addition amount of the resin particles is from 3 mass % to 20 mass % with respect to the total amount of the inkjet recording liquid.

* * * * *